United States Patent
Florsheim, Jr. et al.

[15] 3,640,623
[45] Feb. 8, 1972

[54] AUTOMATIC DENSITY SETTING APPARATUS

[72] Inventors: Leonard S. Florsheim, Jr., Lake Forest; David A. Lieberman, Wilmette, both of Ill.; Harold B. Archer, Pittsford, N.Y.; Gerhard A. Nothmann, Winnetka, Ill.

[73] Assignee: Enivar Enterprises Inc., Chicago, Ill.

[22] Filed: Oct. 24, 1969

[21] Appl. No.: 869,013

[52] U.S. Cl. .................................. 355/67, 95/10 A, 95/10 B
[51] Int. Cl. .................................................. G03b 27/54
[58] Field of Search ............... 355/67, 68, 69; 95/10 A, 10 B

[56] References Cited

UNITED STATES PATENTS

| | | |
|---|---|---|
| 1,255,167 | 2/1918 | Howie .................................. 95/10 A |
| 2,268,436 | 12/1941 | Ash ..................................... 95/10 A |
| 2,430,253 | 11/1947 | Simmon ......................... 95/10 A UX |
| 2,450,319 | 9/1948 | Weisglass ...................... 95/10 A UX |
| 2,460,060 | 1/1949 | Butler ............................ 95/10 A UX |
| 2,462,339 | 2/1949 | Simmon ................................ 95/10 A |
| 2,703,035 | 3/1955 | Tobler ............................... 95/10 A X |
| 2,729,155 | 1/1956 | Fix .................................. 95/10 B X |
| 2,795,168 | 6/1957 | Bauer ..................................... 355/68 |
| 3,096,709 | 4/1963 | Simmon ............................. 355/69 X |

*Primary Examiner*—Samuel S. Matthews
*Assistant Examiner*—Monroe H. Hayes
*Attorney*—Hill, Sherman, Meroni, Gross & Simpson

[57] ABSTRACT

A device that converts copy densities into exposure times for main, flash and bump exposures required in halftone reproduction. Two separately movable scales of an evaluator are set to store intelligence mechanically corresponding to highlight and shadow densities of material to be copied. The evaluator is then placed into a receptor which is connected electrically to a master control unit to convert the evaluator mechanical settings into appropriate electrical signals for automatically regulating the camera lights, the auxiliary flash lamp and the shutter of the camera in order to automatically and instantaneously provide properly exposed main, flash and bump exposures.

21 Claims, 14 Drawing Figures

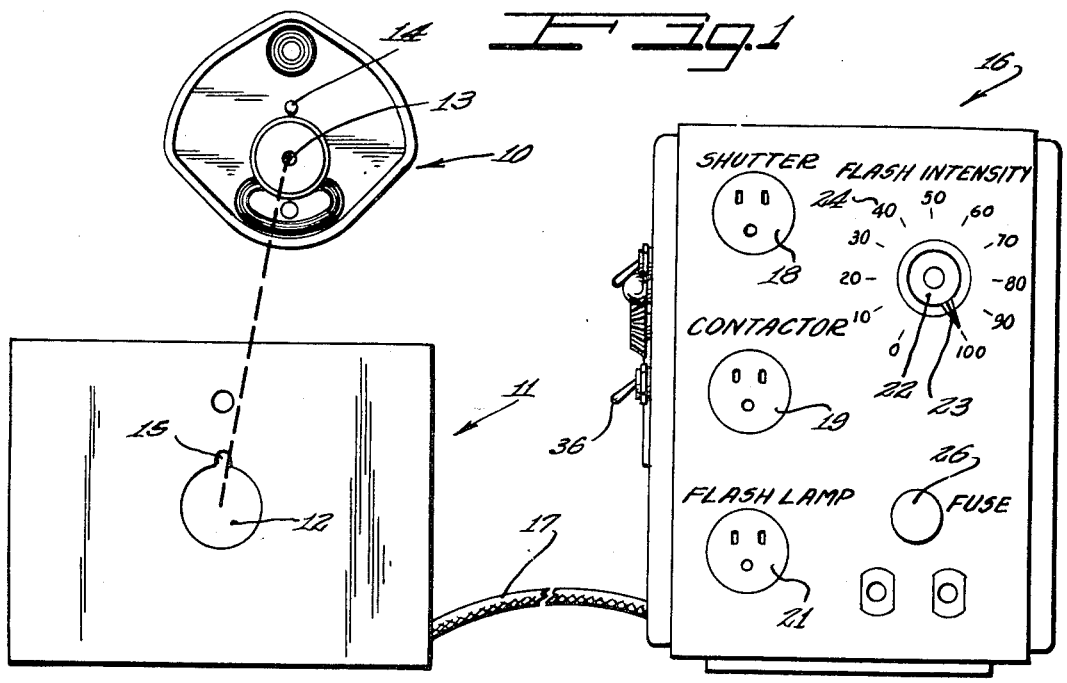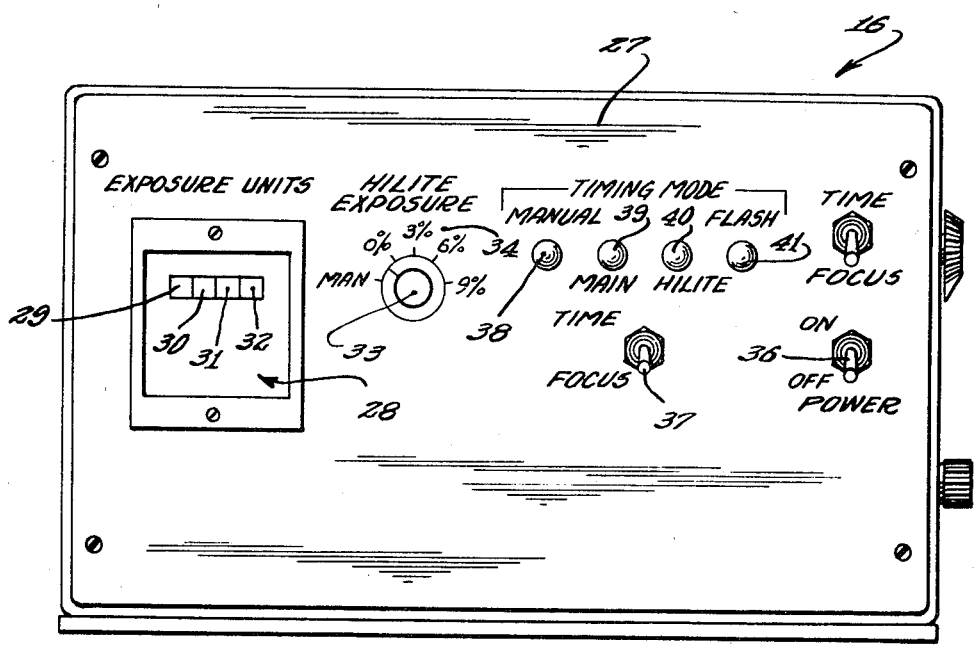

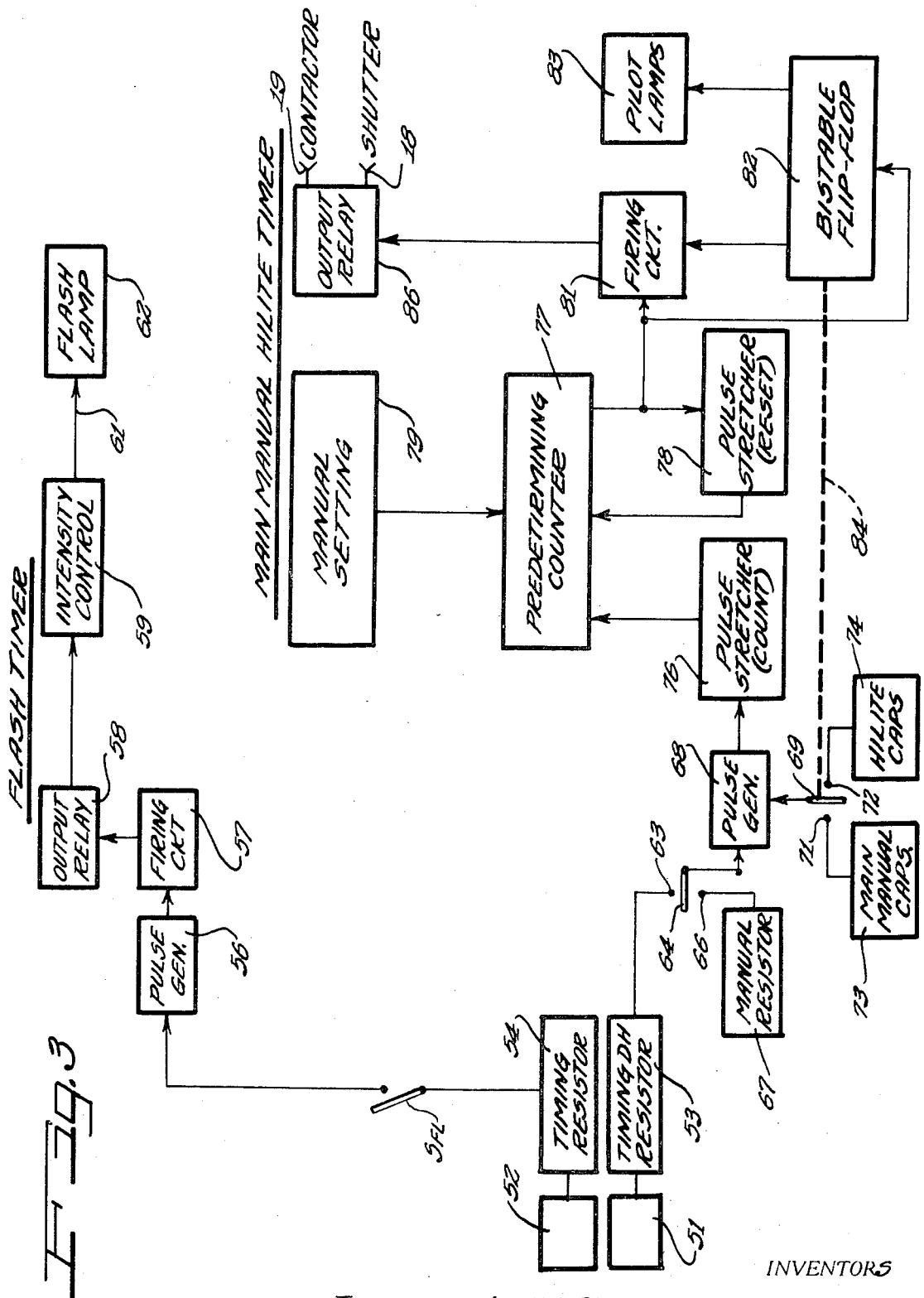

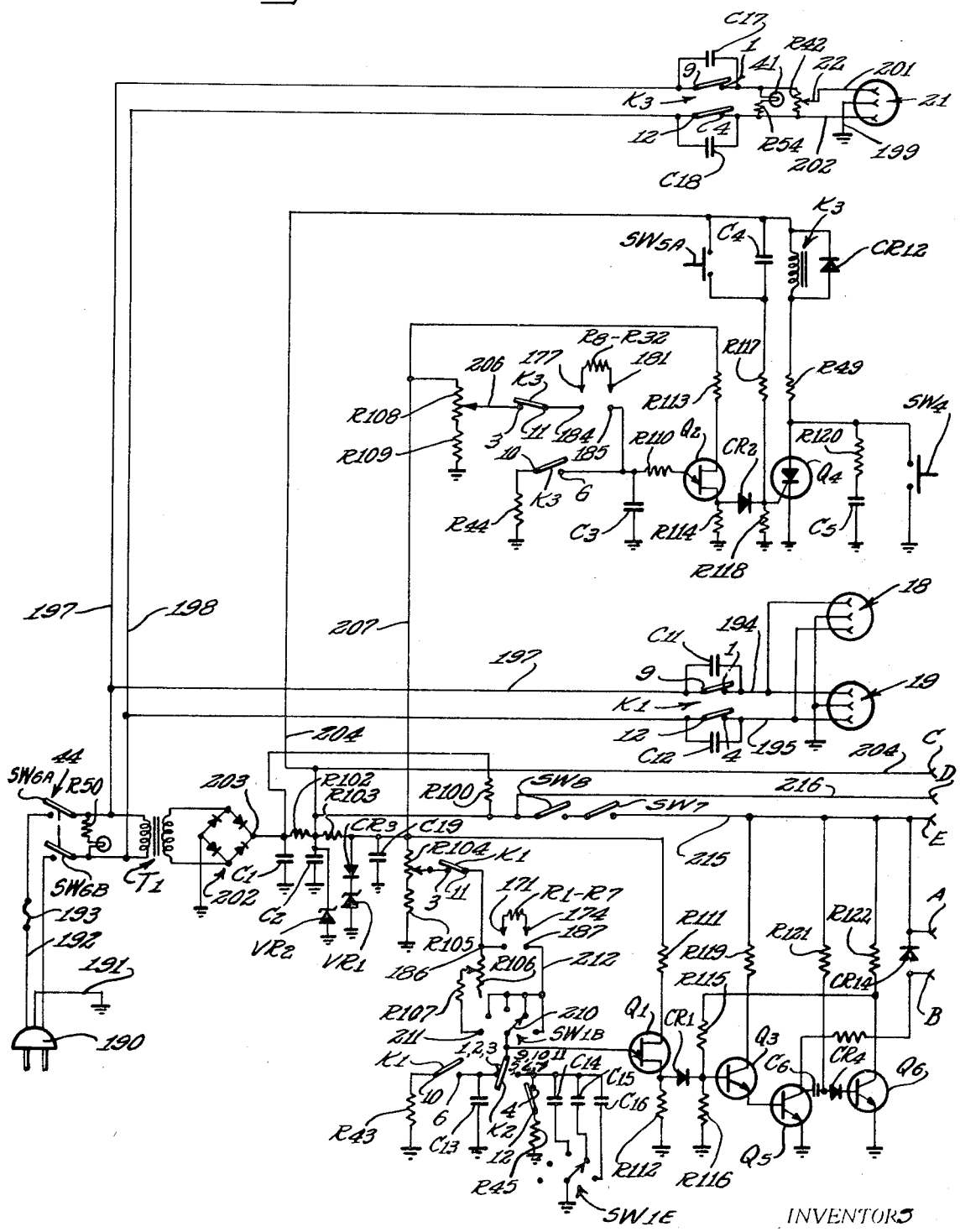

PATENTED FEB 8 1972
3,640,623
SHEET 4 OF 7
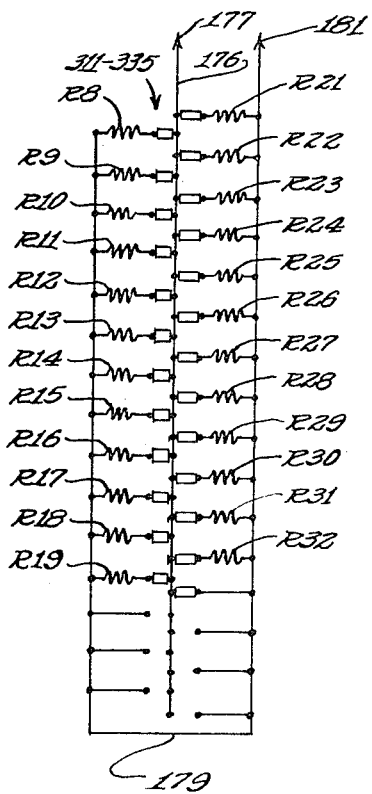
Fig. 4C
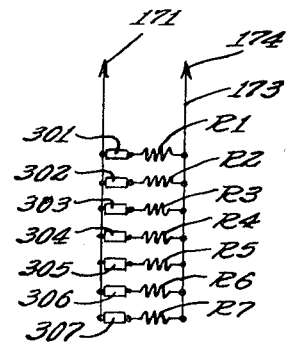
Fig. 4D
Fig. 4B
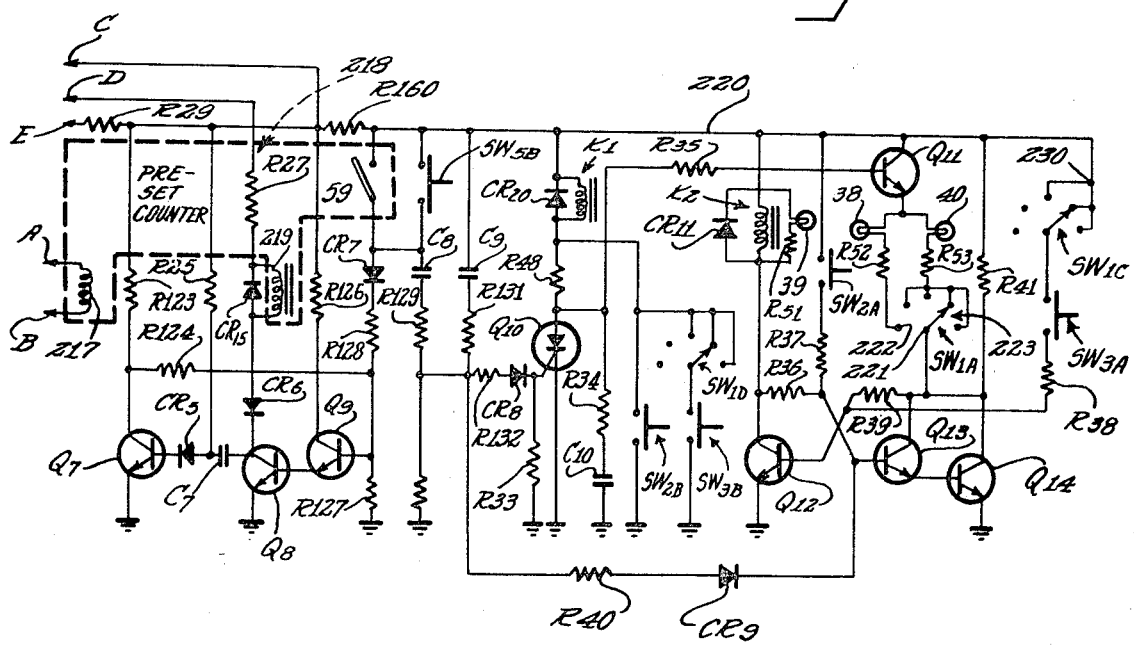
INVENTORS
Leonard S. Florsheim, Jr.,
David A. Lieberman, Harold B. Archer, Gerhard A. Nothmann
BY Hill, Sherman, Meroni, Gross & Simpson ATTORNEYS

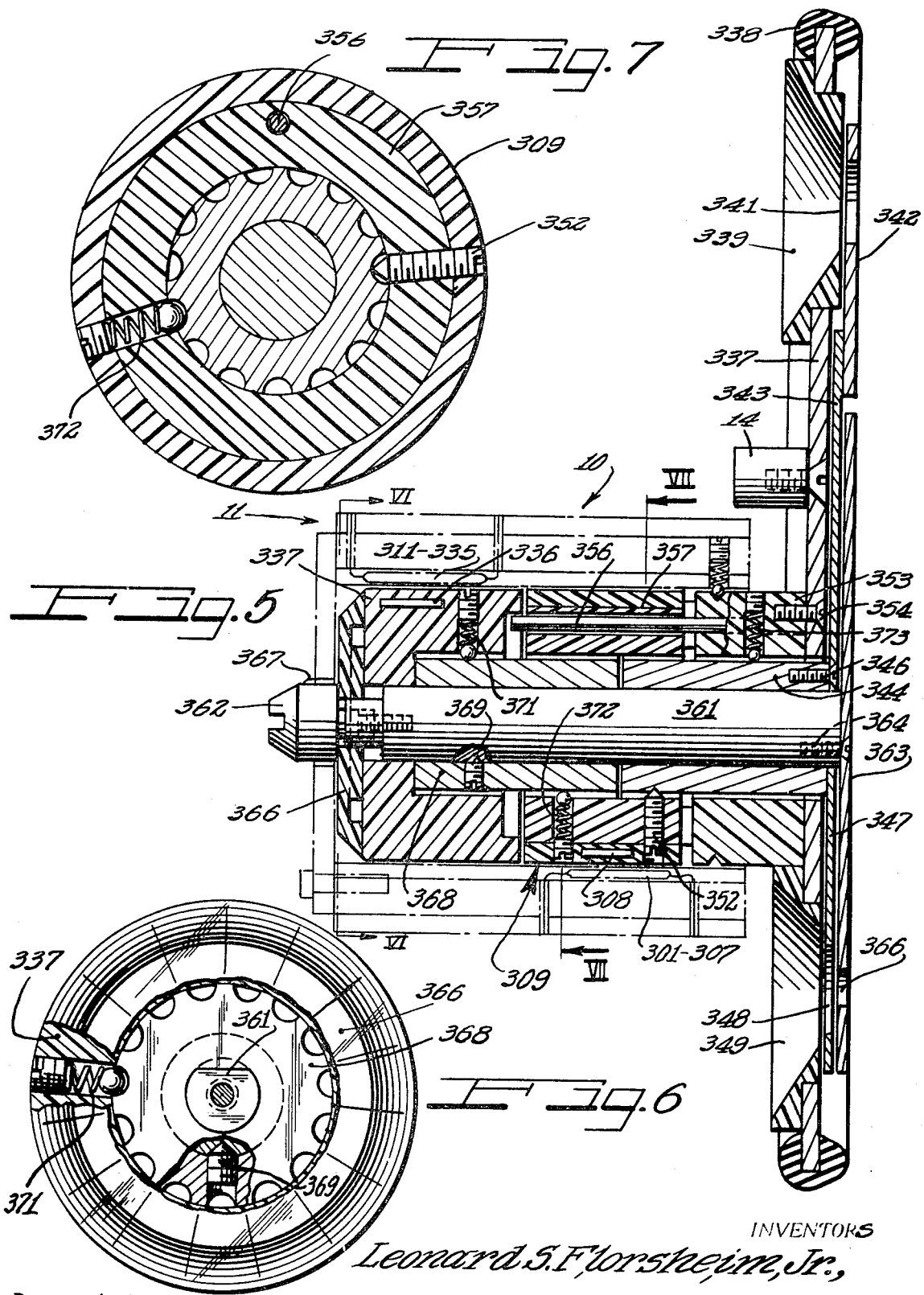

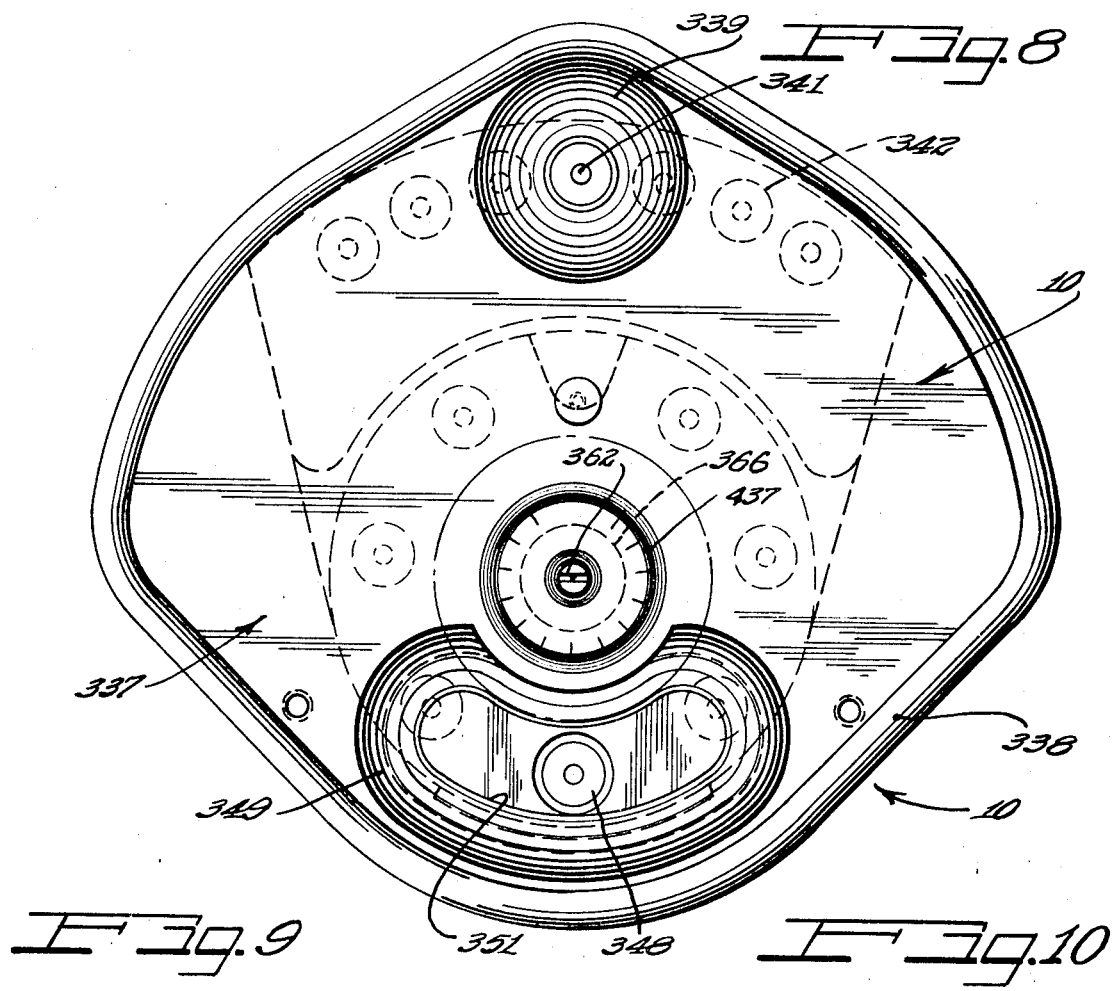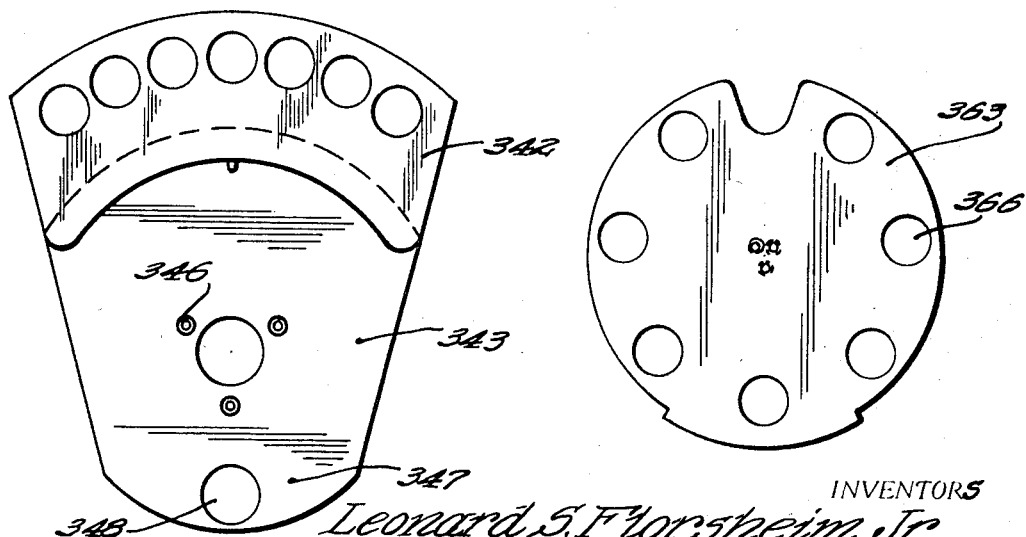

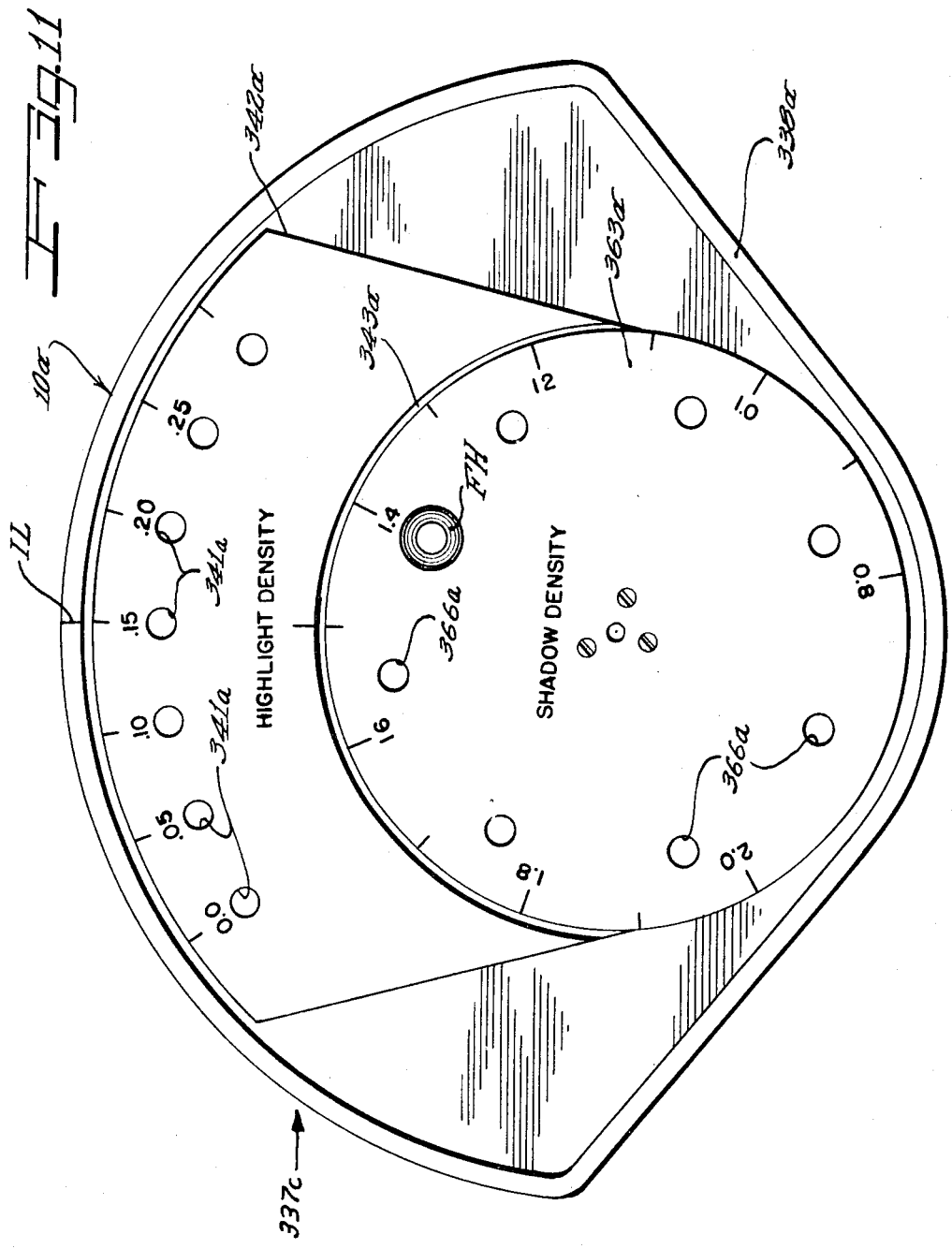

AUTOMATIC DENSITY SETTING APPARATUS

BACKGROUND OF THE INVENTION

1. Field of the Invention

This invention relates generally to graphic arts cameras and particularly to automatic density setting apparatus for a process camera.

2. Description of the Prior Art

The present invention constitutes an improvement on the disclosure of copending application, Ser. No. 786,280 filed Dec. 23, 1968, owned by the same assignee of the present application.

Continuous tone images have many shades of gray, or color, which constitutes the "tone variation." In halftone photography these are converted into "screened images" in which the tone gradations are caused by dot patterns, the dots being of uniform color and uniform spacing, but their size being representative of the tone of the image, larger dots representing dark tones and smaller dots representing light tones.

There are three separate exposures of a film which are made during production of a halftone. The first is a highlight or "bump" exposure which is through the lens without a halftone screen. A so-called "main exposure" is through the lens to the subject with a halftone screen in place. The third is a flash exposure in which the film is exposed to nonimage light directly and may not be through the lens exposure. The times for these three exposures are often calculated by measuring a selected highlight density and a selected shadow density of a copy image and by then calculating the various exposures from such measurements. The difference between the highlight and shadow densities is called the density range. The difference between the maximum highlight and shadow densities, on the copy, which are to be reproduced, respectively, by the smallest white and the black dots in the negative, is called the copy density range.

The density range of the copy, decreased by a fixed quantity which is dependent upon the particular camera, screen, film and other conditions, is known as the excess density range. The excess density range is a factor in determining the time for the flash exposure and the highlight density is a factor in determining the time for the main exposure. The bump exposure is often expressed as a percentage of the main exposure.

In the prior art, the highlight density and the shadow density values are measured and the various exposures are then estimated or calculated from these values. More recently, such values are programmed on an electronic computing system for automatically initiating the proper exposures on the camera. Since these calculations when made manually are fairly complicated, highly trained employees must be used and there is a possibility of errors being made.

Even for automatic calculations, the need for reading, recording, retrieving, and dialing several density values for each set of exposures represents a time and accuracy problem. For high production operations, the time required for such calculations and for trial and error shots, are costly and take a considerable amount of time.

Prior art devices sometimes rely on the use of photoelectric integrators to provide exposure control. Such devices are inherently costly and are occasionally unreliable.

SUMMARY OF THE INVENTION

The present invention is an instrument system that provides the flexibility and versatility good cameramen require to produce consistently uniform negatives from every type of copy. In essence, the system of the present invention utilizes a device that converts copy densities into exposure times for main, flash and bump exposures required for halftone reproduction, thereby allowing better control and consistency on the camera and permitting standardization of all darkroom procedures and close quality control of all prepress work.

The present invention utilizes a portable evaluator which has a pair of gray scales that may be positioned to produce a match with the copy, thereby permitting even the most unskilled cameraman to select particular shadow and highlight densities by a direct comparison inspection.

Selective matching by the operator is accomplished by viewing appropriate portions of the copy through apertures in the gray scale steps and comparing the tone of the copy are viewed with that of the gray scale step surrounding the aperture. The selection of the densities by a mechanical manipulation of two separate adjustment collars automatically establishes the times for various exposures without further computation by the operator and the evaluator may then be placed into a receptor which is, in turn, connected to a main or master control unit to automatically and instantaneously control the correct exposure times. The master control unit may be located in a remote position from the evaluator and the receptor, for example, by means of a cable between the receptor and the master control unit.

Thus, after the operator has selectively matched the highlight and shadow densities, the exposures for making a halftone may be immediately made.

The operator need not read dials, observe numbers, or do any computation in that the system of the present invention automatically calculates the correct exposure times after the shadow and highlight density settings have been mechanically made in the evaluator.

The evaluator of the present invention is a light, easily portable unit which may be readily moved to difference locations. The evaluator carries magnets disposed in positions which depend upon the mechanical highlight and shadow density settings, thereby to selectively actuate magnetic responsive switches such as reed switches in the receptor thereby conditioning electrical circuitry to generate the necessary electrical signals for regulating the exposure times.

BRIEF DESCRIPTION OF THE DRAWINGS

FIG. 1 illustrates the three units of the present invention, namely, the evaluator, the receptor and the master control unit.

FIG. 2 is a front view of the master control unit of the invention.

FIG. 3 is a block diagram illustrating the system of the present invention.

FIG. 4 is an electrical schematic of the invention with FIGS. 4A and 4B comprising the electrical schematic of the master timer and the receptor.

FIGS. 4C and 4D illustrate the timing resistor selecting means in the receptor.

FIG. 5 is a sectional view of the evaluator of the present invention.

FIG. 6 is a cross-sectional view of the evaluator shown in FIG. 5 and is taken on line VI—VI of FIG. 5.

FIG. 7 is a cross-sectional view of the evaluator of FIGS. 5 and 6 taken on line VII—VII of FIG. 5.

FIG. 8 is a top plan view of the evaluator of the present invention.

FIG. 9 is a detail view of a fan-shaped highlight scale used in the evaluator of FIG. 5.

FIG. 10 is a plan view of the shadow scale used in the evaluator of FIG. 5.

FIG. 11 is a bottom plan view of the evaluator but showing a somewhat modified construction from that shown in FIG. 8.

DESCRIPTION OF THE PREFERRED EMBODIMENTS

The details of a process camera as used in the graphic arts industry and with which the subject matter of the present invention finds particular utility have not been disclosed in detail. It will be understood by those versed in the art that the usual process camera includes a construction which can be employed in conjunction with a darkroom and a gallery. Thus, the vacuum film holder and associated components will be located in the darkroom, while the copyboard will be located in the gallery. Associated with such a camera will be the usual camera lights as well as an auxiliary flash lamp and shutter operating means.

In FIG. 1 is shown the three main components of the automatic density setting apparatus of the present invention and by means of which the novel method steps of the present invention may be practiced. An evaluator is shown generally at 10 and has movable scales that may be set to selectively match the highlight and shadow density of a copy to be reproduced. The evaluator 10 is receivable in a receptor 11 which is formed with an opening 12 into which an extending portion 13 of the evaluator 10 may be received. An aligning pin 14 is mounted on the evaluator 10 and fits into an opening 15 formed in the receptor 11 so that the evaluator 10 is properly indexed or polarized.

A master control unit 16 is connected to the receptor 11 electrically by a cable 17 and is programmed for various exposures, based on previous calibration procedures.

The calibration procedure provides parameters by which the master control unit 16 is preset for environmental and operating conditions such as particular camera, screen, emulsion and other factors. Programming consists of entering the appropriate parameters into the system. In operation, the evaluator 10 provides specific signals to the master control unit 16 via the receptor 11 and such signals are based on selectively matched copy densities.

The evaluator unit 10 and receptor 11 may be located in a different room from the master control unit 16. The master control unit 16 may be mounted in the darkroom and the cable 17 may extend to the gallery where the receptor 11 is located.

The master control unit has plugs for a shutter 18, a contactor 19 and a flash lamp 21 on its end, as shown in FIG. 1. A flash-intensity knob 22 has a pointer 23 which may be read against a numerical scale 24. A fuse 26 is also mounted in the end of the master control unit 16.

FIG. 2 illustrates the front panel 27 of the master control unit 16 upon which is mounted a digital thumb wheel switch 28 that has indicator wheels 29, 30 and 31. A selector switch 33 is also provided which may be set relative to an indicia scale shown at 34. A power switch 36 is also mounted on the front panel 27 and is utilized to turn on the main power to the unit. A time focus switch 37 is also mounted on the front panel 27.

In accordance with this invention, exposure pushbuttons corresponding to manual, main, bump or highlight and flash and indicated by numerals 38, 39, 40 and 41 are mounted on the front panel 27 of the master control unit.

It should be understood that the functions of the pushbuttons referred to 38-41, inclusive, can be performed alternatively by a lesser number of buttons, for example, by using the selector switch 33 for preselecting the manual or automatic mode of operation. The terms "bump," "highlight," "highlighting exposure" and "no-screen exposure" are used interchangeably in the graphic arts field to designate the same function.

Referring to FIG. 3 which is a block diagram of the system of the present invention, when the evaluator 10 is set to the proper highlight and shadow densities and placed into the receptor 11, a particular highlight density switch 51 will be closed and particular excess density range switch 52 will also be closed. These particular switches 51 and 52 will respectively connect a highlight timing resistor in the timing resistor bank 53 in the circuit of the main manual timer and a timing resistor from the resistor bank 54 into the circuit of the flash timer. The selected EDR timing resistor 54 is connected to a switch SFL which when closed connects the selected resistor from the bank of timing resistors 54 to a pulse generator 56 which produces an output that is supplied to firing circuit 57 which is in turn connected to control an output relay 58. The output of the relay 58 is supplied to an intensity control 59 which has an output lead 61 that is connected to the flash lamp 62. The particular timing resistor 54 selected by the EDR switch 52 determines the timing of the pulse generator 56 and thus the length of time that the firing circuit 57 is energized.

The highlight density switch 51 selects a particular timing highlight resistor from the bank of resistors 53 and connects it to a contact 63 engageable by a movable switch 64. The switch 64 may also be moved to engage a contact 66 which is connected to a manual resistor 67. A pulse generator 68 is connected to the switch contact 64 and receives an input from a switch 69 that is movable between contacts 71 and 72 that are respectively connected to main manual capacitors 73 and highlight capacitors 74. A pulse stretcher 76 receives the output of the pulse generator 68 and supplies an input to a predetermining counter 77 which also receives an input from a rest pulse stretcher 78. The predetermining counter is also connected to a manual setting unit 79. A firing circuit 81 is connected to the output of the predetermining counter 77 and also receives an input from a bistable flip-flop circuit 82 which provides an output to pilot lamps 83. The bistable flip-flop circuit has a linkage 84 that connects it to the contact 69.

An output relay 86 is connected to the output of the firing circuit 81 and shutter plug 18 and contactor plug 19 are energized by the output relay 86.

The evaluator 10 is shown in detail in FIGS. 5 through 10. It is to be realized that the evaluator 10 controls the selection of the highlight density resistor 53 and the EDR resistor 54 for controlling the various exposure times. The following basic equations are of importance in understanding the invention.

$$T_M = T_0 \, 10^{DH} \qquad (1)$$
$$T_H = p \, T_M \qquad (2)$$
$$T_F = T_B = T_B / 10 \, EDR \qquad (3)$$
$$EDR = D_S = D_H = BDR \qquad (4)$$

In these equations, $T_M$ is the exposure time for the main exposure, $T_H$ is the exposure time for the highlight (bump) exposure, $T_F$ is the exposure time for the flash exposure. $D_S$ is the shadow density obtained by the evaluator; $D_H$ is the highlight density obtained by the evaluator; $T_0$ is the calibration setting on the digital thumb wheel switch 28 of the master control unit 16. The BDR is the basic density range established by the operator during calibration and is entered on the column of the evaluator. $T_B$ is the basic flash time built into the master control unit 16.

The evaluator 10 has highlight and shadow gray scales consisting of plural gray scale steps arranged in an arcuate row. Each step may be apertured to facilitate an inspection comparison of the scale step to the copy for selective matching. The evaluator has a fan-shaped configuration. The highlight density scale is set to match one area on the copy and this setting positions a magnet for subsequently closing a switch in the receptor that might be, for example, a reed switch for connecting the proper highlight density resistor 53 into the circuit of the main control unit. The setting of the highlight density scale moves a window through which the shadow density scale is visible and the shadow density is set so as to match a selected shadow area on the copy. The setting of the shadow density establishes the position of a magnet which selects the EDR timing resistor and it is to be particularly noted that the position of the selecting magnet for this resistor depends upon the setting of both the highlight density scale as well as the shadow density scale since the highlight density scale positions a window through which the shadow density scale is viewed. In addition, the BDR setting on the column of the evaluator 11 controls the selection of the EDR resistor.

FIG. 6 illustrates the evaluator 10 in section. In FIG. 5 the evaluator is mounted in the receptor 11. Mounted in the receptor about the periphery of the receptor ring are two groups of reed switches 301 to 307 which are mounted adjacent a switch closing magnet 308, mounted in a lower knob 309 of the evaluator 10. The second group of reed switches 311 to 335 are mounted adjacent two switch actuating magnets 336 which are mounted in an upper knob 437. As best shown in FIGS. 5 and 8, the evaluator 10 has a main body portion 337 of generally fan-shaped configuration and which may be flanged at its outer periphery as shown in FIG. 11, or which may have a rim 338 for supporting the evaluator 10 on the surface of the copy being evaluated. A highlight density eyepiece 339 is adjacent the edge of the body portion 337 and has a highlight density opening or window 341 through which a gray scale step of a highlight density scale 342 is visible.

The gray scale 342 comprises a plurality of separate gray scale steps each shown at 342a-g, inclusive, and each respective gray scale step constitutes an area of discrete tone density representing gradations in a selected range and having any selected geometric configuration such as the circles shown in the drawings. In order to facilitate comparison inspection of the gray scale steps with the copy, the respective areas may be notched, apertured or otherwise disposed, for example, by use of the centrally disposed apertures 342h located in each of the respective gray scale steps and through which the copy material is examined and compared to the corresponding gray scale step.

The highlight density scale 342 is attached to a plate 343 which is, in turn, connected to a collar 344 by fastening means 346. A mask portion 347 of the plate 343 is formed with an opening 348 and is visible through a crescent-shaped slot 351 formed in an eyepiece 349 in the main body portion 337 of the evaluator 10. The member 343 with its portions 347 and 342 and the opening 348 is illustrated in FIG. 9. The collar 344 is connected to a knob 309 by a setscrew 352. A cylindrical member 353 is integrated with the frame of the evaluator 10. If separate parts are used as illustrated herein, the parts are connected, for example, by screws 354. An upwardly extending pin 356 extends through a slot 357 formed in the knob 309 and is engageable with abutments means in an upper knob 437 to limit angular motion relative to the main body portion 337.

As the lower knob 309 is rotated, it turns the cylindrical member 344, the plate 343 and the highlight density scale 342 which may be read through the opening 341 and matched to a selected highlight density area of the copy to be reproduced. Simultaneously, with the setting of the highlight density scale 342 and the window 341, the openings 348 will be moved in the crescent-shaped window 351.

The upper knob 437 is connected to a shaft 361 by a setscrew 362. The lower end of the shaft 361 carries a plate 363 which is attached to the shaft 361 by a plurality of screws 364.

The plate 363 carries a shadow density scale 366 consisting of a plurality of gray scale steps 366a-g, inclusive, of graduated tone density, each of the gray scale steps being apertured as at 366h in a manner similar to the gray scale 342. The gray scale steps of the shadow density scale 366 are herein shown as disposed in a circumferentially extending row of spaced-apart circular areas, although it will be understood that other geometric shapes and dispositions could be used.

By rotating the upper knob 437 to align the shadow density scale 366 through the window 348 with the shadow density area selected on the material to be copied, the switch selecting magnets 336 will be positioned to an angular position dependent upon the highlight density, the shadow density and the BDR which is determined by the position of the knob 437 relative to the shaft 361.

A calibrated dial 366 is corotatably connected as at 366a with the shaft 361 and is retained in such assembly by a pilot screw 362. The pilot screw 362 has an outwardly projecting head which forms a pilot portion for assisting in locating the evaluator 10 in the receptor 11. To alter the BDR setting, the pilot screw 362 is loosened and the dial 366 is angularly adjusted relative to the upper knob 437.

A cylindrical member 368 is connected to the shaft 361 by a setscrew 369 and suitable detents 371 through 373 are provided for retaining the various knobs and scales in selected positions. More specifically, it will be noted that the collar 344 has its outer peripheral surface formed with a plurality of circumferentially spaced axially extending flutes or recesses 344a shaped to cooperatively receive and seat a ball detent 372a biased by a coil spring 372b, the opposite end of which is bottomed against a setscrew 372c. The disposition and spacing relationship of the detent means may be selected to correspond to the number of steps on the corresponding gray scale so that each of the density steps will be distinct and will correspond to a click in the mechanism which is audible and detectable.

It will be understood that the collar 437 is likewise provided with fluted recesses as at 437a for receiving a ball detent 371a spring-biased by a coil spring 371b retained by a setscrew 371c.

After the highlight density and shadow density scales have been set the evaluator 10 is inserted into the receptor 11 such that the aligning pin 14 aligns with the opening 16 and a suitable positioning detent 375 is provided for properly positioning the evaluator in the receptor. The evaluator actuates one of the switches 301 through 307 and one of the switches 310 to 335 which select one of the resistors from each of the resistor banks 53 and 54 to establish the proper exposure times in the main control unit.

FIGS. 4C and 4D illustrate the switches 301-307 and 311-335 respectively. These switches are selectively closed by magnets 308 and 336, respectively, to selectively place different resistances in circuit for the timing device. The values of these resistors determine the particular times for the various exposures. For example, one side of switches 301-307 are in engagement with a bus which is connected to an output terminal 171. The other sides of switches 301-307 are respectively connected to resistors R1-R7, for example. The other end of the resistors R1-R7 are connected to a bus 173 which connects to an output terminal 174. As shown in FIG. 4C, switches 311-335 have one side connected to a bus conductor 176 which connects to an output terminal 177. The other sides of switches 311-335 are connected to first ends, respectively, of resistors R8-R32. The other sides of resistors R8-R32 are connected to a common terminal bus 179 which is connected to an output terminal 181. The magnet 336 closes one of the switches 311-335 to connect one of the resistors in circuit.

FIGS. 4A and 4B illustrate the master timer of this invention and it is to be noted that the resistors R8-R32 are connected across the terminals 177 and 181 which engage, respectively, the terminals 184 and 185 in the master timer unit. These resistors control the timing for the flash exposure.

The resistors R1-R7 connect to terminals 186 and 187, respectively. These resistors control the timing for the main and bump exposures.

FIGS. 4A an 4B illustrate the electrical schematic for the master timer unit 16. A power plug 190 is inserted into a suitable power supply and has a grounded terminal 191. One lead 192 is connected to a fuse 193, and contacts of switches SW6A and SW6B are linked together and are controlled by the toggle on-off switch 36. A resistor R50 and power-on light are connected across the switches SW6A and SW6B. A transformer T1 has its primary connected across the switches SW6A and SW6B. The shutter and contactor plugs 18 and 19 are connected in parallel across leads 194 and 195 and have grounded contacts 196. A relay K1 controls switches between relay contacts C1 and C9 and C4 and C12, respectively, in leads 197 and 198. The capacitor C11 is across contacts K1, C1 and C9 and capacitor C12 is across contacts K1, C4 and C12. AC power leads 197 and 198 also are connected to contacts C9 and C12 of relay K3 which has contacts C1 and C4, respectively, that may be connected to contacts C9 and C12. A capacitor C17 is connected across contacts C9 and C1, and a capacitor C18 connected across contacts C12 and C4. Flash lamp 41 and resistor R54 are connected in series between contacts 1 and 4. A flash intensity potentiometer R42 is controlled by knob 22. Flash lamp plug 21 has a grounded lead 199 and power leads 201 and 202 that are respectively connected to contacts C4 of relay K3 and to the wiper contact on the potentiometer R42.

The secondary of transformer T1 is connected to a diode rectifier 202 which has one point grounded and the other point 203 connected to a capacitor C1 which has its other side connected to ground. A lead 204 is connected from resistor 102 and to a capacitor C4 which is across the switch SW5A. The resistor R17 is connected to the switch SW5A and the capacitor C4, and the other side is connected to the gate of a SCR Q4 and to a resistor R118 which has its other side connected to ground. The cathode of the SCR is connected to ground. The anode of the SCR is connected to a resistor R49 which has its other side connected to the relay K3 and a diode CR12. The other side of the relay and diode CR12 are connected to lead 204. A resistor R120 is connected between resistor R49 and a capacitor C5 which has its other side connected to ground. A switch SW4 is connected across the resistor R120 and the capacitor C5.

A diode CR2 is connected between the gate of SCR Q4 and one side of resistor R114 which has its other side connected to ground. A transistor Q2 has an electrode connected to the resistor R114 and a diode CR2 has an input electrode connected to the resistor R110. The other side of resistor R110 is connected to terminal 185 and to a capacitor C3 which has its other side connected to ground. Contact 6 of relay K3 is also connected to contact 185, and contact 10 of relay K3 is connected to resistor R44 which has its other side connected to ground. Contact 184 is connected to contact 11 of relay K3, and contact of relay K3 is connected to wiper contact 206 of potentiometer R108. One end of potentiometer R108 is connected to resistor R109 which has its other side connected to ground. The other side of potentiometer R108 is connected to lead 207. Lead 207 is connected to resistor R113 which is connected to the third electrode of the semiconductor device Q2. Lead 207 is also connected to a potentiometer R104 which has its other side connected to a resistor R105 which has its other side connected to ground. A capacitor C19 is connected across the potentiometer R104 and resistor R105. A diode CR3 and zener VR1 are connected in opposite polarity across the capacitor C19. A resistor R103 is connected between lead 204 and lead 207. A capacitor C2 and zener VR2 are connected in parallel between ground and lead 204. The wiper contact of potentiometer R104 is connected to contact 3 of relay K1. Contact 11 of relay K1 is connected to contact 186. Potentiometer R106 is connected to contact 186 and has a wiper contact that connects to resistor R107. Switch SW1B has a movable contact 210 for engaging a contact 211 that is connected to the other end of resistor R107, and a plurality of contacts which are connected electrically to lead 212 which is connected to contact 187. Contact 210 is connected to terminals 9, 10 and 11 of relay K2, and the movable contact of the relay K1 is movable to engage contacts 1, 2 and 3 or 5, 6 and 7 of the relay. A capacitor C13 is connected from contacts 1, 2 and 3 of the relay K2 to ground. Contacts 10 and 6 of relay K1 are connected between capacitor C13 and resistor R43 which has its other side connected to ground.

Contacts 4 and 12 of relay K2 are connected between resistor R45 which has its other side connected to ground and contacts 5, 6 and 7 of relay K2. Capacitors C14, C15 and C16 have first sides connected together and to contact 4 of relay K2 and the other sides connected to contacts of switch SW1E. The wiper contact of switch SW1E is connected to ground.

A unijunction transistor Q1 has its emitter electrode connected to contact 210. The first base of the unifunction transistor Q1 is connected to a resistor R11 which has its other side connected to lead 207. A resistor R112 is connected between ground and the second base of the unijunction transistor Q1. A diode CR1 is connected from the second base of Q1 to the base of transistor Q3. A resistor R116 is connected from the base of transistor Q3 to ground. A resistor R115 is connected from the base of the transistor Q3 to the collector of a transistor Q6. The emitter of transistor Q3 is connected to the base of transistor Q5 which has its emitter connected to ground. The collector of transistor Q5 is connected to a capacitor C6 which has its other side connected to diode CR4. The base of transistor Q6 is connected to the diode CR4. The emitter of the transistor Q6 is connected to ground. The collector of transistor Q6 is connected to a resistor R122. The second sides of resistors R119, R121 and R122 are connected together to a lead 215. The lead 215 is connected to a switch SW7 which is connected in series with a switch SW8. A lead 216 is connected from switch SW8 and resistor R100 to a connection point D. Lead 204 is connected to a connection point C and lead 215 is connected to a connection point E.

FIG. 4B illustrates connection points A, B, C, D and E. The countdown coil 217 of a preset counter 218 is connected across terminals A and B. A transistor Q7 has its emitter connected to ground and its collector connected to a resistor R123 which has its other side connected to resistor R59 which has its other side connected to point E. A transistor Q8 has its emitter connected to ground and its collector connected to a capacitor C7 which has its other side connected to a diode CR5 which has its other side connected to the base of the transistor Q7. A resistor R125 is connected from the diode CR5 and the capacitor C7 to the resistor R59. Point D is connected to the resistor R47 that has its other side connected to parallel combination of the diode CR15 and the reset coil 219 for the preset counter 218. Diode CR6 is connected from the diode CR15 to the collector of transistor Q8. The transistor Q9 has its emitter connected to the base of transistor Q8 and its collector connected to a resistor R126 which has its other side connected to point C. A resistor R127 is connected from the base of the transistor Q9 to ground. A resistor 160 is connected from point C to switch S9 which is the final count output of the preset counter 218. A diode CR7 is connected to the switch S and a resistor R128 is connected to the other side of the diode. The other side of the resistor R128 is connected to the base of the transistor Q9 and to a resistor R127 which has its other side connected to ground. A switch SW5B is connected between resistor R160 and a capacitor C8 which is also connected to the diode CR7. Resistor R129 and resistor R130 are connected in series between ground and the other side of the capacitor C8.

A capacitor C9 and resistor R131 are connected from resistor R160 to a junction point F. A resistor R132 and diode CR8 are connected in series between the junction point F and the gage of an SCR Q10. Resistor R33 is connected from the gate of SCR10 to ground. The cathode of SCR10 is connected to ground. The anode of SCR10 is connected to resistor R48 which has its other side connected to the relay coil of relay K1. A diode CR20 is connected across the relay coil K1. The other side of the relay coil K1 is connected to resistor R160. A capacitor C10 and resistor R34 are connected in series between ground and the anode of SCR Q10, and the resistor R35 is connected from resistor R34 to the base of a transistor Q11. The collector of transistor Q11 is connected to lead 220 and the emitter transistor Q11 is connected to indicator lights in actuators 38 and 40. The switch SW1A has a movable contact 221 which engages contacts 223 and 222, respectively. The resistor R52 is connected between indicator light in actuator 38 and contact 222 and the resistor R53 is connected between indicator light 40 and contact 223. The contact 221 is connected to a resistor R39 and the collectors of transistors Q13 and Q14. The emitter of transistor Q14 is connected to ground. The emitter of transistor Q13 is connected to the base of transistor Q14. The base of transistor Q13 is connected to the cathode of diode CR9 which is in series with a resistor R40 that has its other side connected to point F. A transistor Q12 has its emitter connected to ground and its base connected to resistor R39 and a resistor R38. Transistor Q12 has its collector connected to the energizing coil of relay K2 which has its other side connected to lead 220. A diode CR11 is connected in parallel with relay K2 and a highlight indicator lamp associated with actuator 40 and resistor 51 are connected in series across the relay coil K2. A resistor R36 is connected from the collector of transistor Q12 to the base of a transistor Q13. A resistor R37 is connected from the base of transistor Q13 to a switch SW2A. The other side of switch SW2A is connected to lead 220. A resistor R38 is connected from base of transistor Q12 to the switch SW3A. The other side of switch SW3A is connected to the movable contact of switch SW1C. Contacts 230 of switch SW1C are connected to lead 220.

In operation, the toggle switch 44 is moved to "on" position closing switches SW6A and SW6B. This supplies a pulse to the power supply which turns SCR Q10 on. This pulse is differentiated by capacitor C9, resistor R131, resistor R132 and diode CR8. This energizes relay K1 which open contacts 1 and 9 and 4 and 12. Relay K1, when energized, closes contacts 6 and 10 providing a discharge path for any residual voltage on timing capacitor C13. Relay K1 also opens contacts 3 and 11, disconnecting the power supply from the timing network. The electronic circuitry has been cocked with these operations.

It is to be realized, of course, that a suitable shutter and light source energizer has been connected to the shutter plug 18 and the contactor plug 19. For main exposure, the actuator 39 is depressed. This closes switch SW2B which turns off SCR Q10. Switch SW2B is mechanically linked to switch SW2B and is simultaneously depressed. Switch SW2A places transistors Q13 and Q14 of the flip-flop, which they form a part, in the "on" state and turns off transistor Q12. This holds transistors Q13 and Q14 in the "on" state.

When the switches SW2A and SW2B are released, relay K1 becomes deenergized and transistor Q11 turns on light 41. Contacts 9, 1 and 12, $d$; 3, 11 and 10, 6 of relay K1 close when the relay K1 is deenergized. This supplies power to the contact plug 19 and the shutter plug 18, and the shutter and the lights for the main exposure will be turned on.

The capacitor C13 will discharge to peak firing voltage of transistor Q1 through the selected resistor $R_1$–$R_7$. When the transistor Q1 fires, a pulse is created at resistor R112 which turns on transistors Q3 and Q5 which pulls in the coil 217 of the preset counter. The count coil is held in until the capacitor C6 charges through resistor R121 to turn on transistor Q6 and turns off transistors Q3 and Q5. The preceding process is repeated until the latching relay of the present counter turns to zero.

The present counter may be set to a desired time by a thumb wheel switch. The indicator wheels 29, 30 and 31 indicate the setting of the thumb wheel switch and this allows variations in the time base of the unit as a function of the setting of the thumb wheel switch. The various exposure times will vary with different settings of the indicator wheels 29, 30 and 31 because the unit counts down to zero from the preset level determined by the settings of the thumb wheel switch. This allows the invention to be set for various parameters.

When the end of the counter is reached to which the counter has been preset, the switch $S_9$ closes applying base voltage turning on transistors Q9 and Q8 which turns off transistor Q7 and pulls in reset coil 219 resetting the counter-back to the predetermined setting. Reset current is released when capacitor C7 charges through resistor R125 to turn transistor Q7 back on and to turn transistor Q8 and Q9 off. Switch S9 also creates pulses through capacitor C8, resistors R129 and R132, diode CR8 and resistor R33 which turns on SCR Q10. This again energizes relay K1 opening the associated contacts of relay K1 which were closed when the relay was deenergized.

When the voltage at the SCR drops to holding voltage (about one-half volt), the transistor Q11 will be turned off which turns indicator light associated with actuator 49 off. This completes the main automatic exposure.

For the highlight exposure, actuator 40 is depressed which corresponds to switches SW3A and SW3B on the electrical schematic. Switch SW3A, when depressed, turns on transistor Q3 through resistor 38 thus turning the light associated with actuator 40 on and energizing relay K2. When relay K2 is energized, contacts 9, 10 and 11 are connected, respectively, to contacts 5, 6 and 7, connecting one of the three capacitors, C14, C15 and C16 in circuit, which has been selected by switch SW1E that is controlled by knob 33 and which selects the percentage of highlight. The relay contacts 4 and 12 are opened removing the discharge path from the selected capacitors C14, C15 and C16. Simultaneously, switch SW3B opens relay K1 and the remaining operation for the highlight exposure is similar to that explained above when the main exposure is being made, except the time will be a percentage of the main exposure due to the placing of the highlight capacitors C14, C15 or C16 in the circuit.

In manual position, however, 0 percent highlight, switches SW1B, SW1C and SW1E all provide open circuits and no highlight exposure can occur.

In manual position, the predetermined setting of the Hecon counter controls the timing. The timer will work without the computer resistors $R_1$–$R_7$ inserted. The pulse repetition rate of transistor Q1 and its timing network R107 and capacitor C13 is fixed at 10 hertz which provides an accuracy of one-tenth second as indicated on the counterdial 28.

For flash exposure, button 41 is depressed which corresponds to switch $SW_4$. This turns SCR $Q_4$ on, an deenergizes relay K3. Contact 11 is connected to contact 3 of relay K3 and contacts 10 and 6 are opened removing the discharge path. Capacitor C3 charges to the peak point firing voltage of unijunction transistor Q2 through the selected EDR resistors $R8$–$R_{32}$. Resistor R110 limits the current through the unijunction transistor Q2. As transistor Q2 fires, pulses are created across resistor R114 which are applied to the gate of SCR Q4 through diode CR2 across resistor R118. SCR Q4 fires, energizing relay K3. The relaxation oscillator fires only once during the timing interval. When contacts 9, 11, 12 and 4 of relay K3 are closed during the timing interval, power is applied to the light associated with actuator 41 and to leads 201 and 202 which is connected to the flash lamps (not shown). The potentiometer R42 allows the intensity of the lamps to be adjusted.

Referring now to FIG. 11, a bottom plan view of the evaluator is shown in FIG. 11 and the structure illustrated therein is in many respects identical to that already described in connection with FIGS. 8, 9 and 10, although the form of the invention illustrated in FIG. 11 has an integral flange 338$a$ by means of which the evaluator may be placed on the surface of copy material being elevated. Since the structural elements of the evaluator shown in FIG. 11 are substantially identical to those already described in connection with FIGS. 8, 9 and 10, similar reference numerals with the suffix a have been used to identify like parts.

It will be noted that the evaluator shown in FIG. 11 has lettered indicia and also corresponding calibration marks adjacent each respective aperture. Thus, the evaluator device of the present invention is given added utility to the operator-user desiring to effect adjustment by use of the numbered indicia.

An index line is shown at IL on the evaluator frame, by means of which the position of the highlight density dial may be indexed. Further, to assist in manually adjusting the index position of the dial, a finger hole is shown at FH.

By virtue of such arrangement, density values can be "dialed in" by the operator into the evaluator. Such density values, of course, are readily available from the evaluator of the invention, but an added flexibility is afforded by the present invention, since the operator may prefer to obtain intelligence from a remote or auxiliary evaluator which he can "dial in" to the evaluator of FIG. 11.

It should be understood that the evaluator mechanism is provided with a number of limit stops which prevent the operator from moving the various parts with respect to each other beyond the limits for which the system was designed; (1) rotation of the upper knob and therefore the shadow dial movement with respect to the main evaluator housing, (2) rotation of the lower knob and therefore the highlight dial with respect to the housing, (3) rotation of the highlight dial relative to the shadow dial, and (4) rotation of the BDR dial with respect to the upper knob.

OPERATION

In operation, the evaluator 10 is used in conjunction with a firm, flat surface to support the copy being evaluated. Good illumination should be provided to aid in visual evaluation.

The value of the BDR is set on the dial on the top of the evaluator column and is locked in place since that value is dependent on the particular screening conditions. For example, the setting is correlated with the screen and the percentage bump used.

The evaluator 10 is placed flat on the surface of the copy so that the ring 338 or flange 338a rests on the copy surface. The highlight density aperture is placed over the lightest highlight area in the copy which is to print with a highlight dot. The lower collar is rotated to move the graduated highlight scale under the window.

When the gray step most nearly matches the selected highlight, the setting is retained mechanically and thereby stored in the evaluator. The density steps are quite distinct, each corresponding to an audible and detectable click in the detent mechanism. The gray scale steps are selected to provide a range within a second or less of theoretical optimum.

The operator then repositions the evaluator 10 and rotates the upper collar of the column until a selected shadow scale step most nearly matches a selected shadow area in the copy. Again, the setting is retained and stored mechanically.

Thus, by physically prepositioning the two parts of the evaluator which are movable not only with respect to one another, but also with respect to the frame of the evaluator as a function of selectively matching steps of a gray scale to selected highlight densities of the copy, the operator has literally converted and stored essential intelligence into a discernible mechanical spatial relationship of the relatively movable parts.

After matching the highlight and shadow densities, the evaluator 10 is inserted into the receptor 11 until it firmly clicks in place. The master control unit 16 actually functions as a small computer since it contains the solid state basic timing circuits that are activating when the evaluator 10 is set into the receptor 11 and the exposure buttons are pushed so that all of the calculations are made automatically and instantaneously.

It will be understood that the camera operator will actuate the digital thumb wheel selector switch 28 to set the basic main exposure time which is related to the type of screen, enlargement or reduction, light position, film emulsion and percentage bump selected. Once programmed for a given set of calibrated conditions, no changes are required on the control panel settings.

The system is thus automatically conditioned to provide properly exposed main, flash and bump exposures upon pressing the exposure buttons in the sequence to which the operator is normally accustomed.

Although various minor modifications might be suggested by those versed in the art, it should be understood that we wish to embody within the scope of the patent warranted hereon all such modifications as reasonably and properly come within the scope of our contribution to the art.

We claim as our invention:

1. The method of camera control which includes the steps of
   placing an evaluator on the surface of material to be copied,
   physically prepositioning two parts of the evaluator which are movable with respect to one another as well as with respect to said evaluator as a function of selectively matched steps of a gray scale to the selected highlight and shadow densities of the copy,
   and inserting the evaluator into a receptor having electrical means responsive to the relative prepositioning of said two parts to automatically regulate the shutter, camera lights and flash lamp of the camera in order to provide properly exposed main, flash and bump exposures.

2. The method of operating a graphic arts camera having a variable timed shutter, bump and flash operations and standard camera lights, which includes the steps of:
   adjustably presetting an evaluator having first and second movable parts which are also relatively movable with respect to one another as a function of two bits of intelligence corresponding to highlight and shadow densities of a material to be copied,
   thereby converting and storing the intelligence bits in a mechanical spatial relationship of the first and second parts, inserting said evaluator into a receptor having electronic conversion means for converting said mechanical spatial relationship into electronic signals,
   and electrically regulating the shutter, bump and flash operations of the camera as a function of said electronic signals.

3. In combination with a process camera having a shutter, camera lights and flash lamp, an automatic density setting apparatus comprising:
   an evaluator having two prepositionable parts which are respectively movable with respect to one another as well as with respect to said evaluator,
   means to move said two parts as a function of selectively matched steps of gray scale to the selected highlight and shadow densities of copy material,
   receptor means for receiving said evaluator in mechanical and electrical assembly therewith,
   said receptor having electrical means responsive to the relative prepositioning of said two parts to generate electrical signals, and a master control unit responsive to said electrical signals for automatically regulating the shutter, camera lights and flash lamp of the camera in order to provide properly exposed main, flash and bump exposures.

4. In combination, a graphic arts camera having a variable timed shutter,
   a flash lamp for said camera arranged and disposed for effecting a flash exposure,
   camera lights for illuminating copy material to be exposed in said camera, and
   an automatic density-setting apparatus operatively associated with said camera comprising an evaluator having first and second movable parts which are also relatively movable with respect to one another,
   means for adjustably presetting said parts as a function of intelligence corresponding to highlight and shadow densities of a material to be copied,
   whereby the intelligence is converted and stored in said evaluator in terms of a mechanical spatial relationship of said first and second parts,
   receptor means into which said evaluator may be mechanically and electrically inserted,
   said receptor having electronic conversion means for converting said mechanical spatial relationship of said evaluator into electronic signals,
   and control means responsive to said electronic signals to automatically regulate the shutter, camera lights and flash lamp of the camera.

5. A computer for automatically calculating exposure times in photography comprising,
   an evaluator for evaluating an image to be reproduced,
   said evaluator comprising a pair of movable gray scale means for matching with the highlight and shadow densities of said image,
   a main control unit for controlling various exposure times in response to the setting of said movable gray scale means when said evaluator is connected to said main control unit,
   wherein said evaluator comprises,
   a housing formed with a pair of openings, one of which is crescent-shaped,
   said highlight density scale means visible through one of said pair of openings and rotatably mounted in said housing to match the highlight density of said image,
   first switch actuator means connected to said highlight density scale means and positioned thereby,
   said highlight density scale means having an extending portion formed with an opening which is aligned with the crescent-shaped opening of said housing and moves in said crescent-shaped opening as the highlight density scale is set through the other opening of said housing,
   said shadow density scale rotatably mounted in said housing and visible through the crescent-shaped opening of the housing and the opening of said extending portion so it may be set to the shadow density of image, and second switch actuator means connected to the shadow density scale and positioned thereby.

6. A computer according to claim 5 wherein said highlight density scale means comprises,
  a generally fan-shaped plate with a plurality of highlight gray scales attached adjacent one edge,
  a collar rotatably supported by said housing attached to said fan-shaped plate and rotatable to match one of the highlight gray scales to an image and to move the opening in said extending portion,
    said shadow density scale means comprises a disc with a plurality of shadow gray scales about its periphery, and
  a shaft rotatably supported by said housing attached to said disc to position said shadow gray scale.

7. A computer according to claim 6 wherein said first switch actuator means is mounted to move with said collar and said second switch actuator means is mounted to move with said shaft.

8. A computer according to claim 7 including means for limiting the angular movement of said collar and fan-shaped plate relative to said housing.

9. A computer according to claim 8 comprising first detent means between said housing and said collar to hold the plate in a set position.

10. A computer according to claim 7 comprising a first knob mounted on said collar and a second knob mounted on said shaft and means for adjusting the angular position of said second knob relative to said shaft.

11. A computer according to claim 10 wherein said first switch actuator means is mounted to said first knob, and said second switch actuator means is mounted to said second knob.

12. A computer according to claim 11 wherein said first and second switch actuator means comprise magnets.

13. A computer for automatically calculating exposure times in photography comprising,
  an evaluator for evaluating an image to be reproduced,
    said evaluator comprising a pair of movable gray scale means for matching with the highlight and shadow densities of said image,
  a main control unit for controlling various exposure times in response to the setting of said movable gray scale means when said evaluator is connected to said main control unit,
  and a receptor electrically connected to said main control unit and formed with an opening into which said evaluator may be received to control set conditions in said main control unit,
    said receptor having a plurality of switch means which are selectively actuated by the positions of said scales when said evaluator is inserted into said receptor for establishing a circuit to provide a given exposure in response to a given setting of said gray scales.

14. A computer according to claim 13 wherein said evaluator has movable switch actuator means for selectively actuating said switch means.

15. A computer according to claim 14 wherein said switch actuator means are magnetic means and said plurality of switch means are responsive to magnetic fields.

16. A computer according to claim 15 wherein said plurality of switch means are mounted in two banks and said switch actuators comprise a pair of magnets, one of which actuates a switch in the first bank and the other of which actuates a switch in the second bank when said evaluator is inserted in said receptor.

17. A computer according to claim 16 comprising means for locating said evaluator in said receptor.

18. A computer according to claim 17, wherein said first and second banks of switch means are mounted in arcs in the receptor and the pair of magnets of the evaluator are movable in arcs and said magnets are each adjacent one of the gray means in one of said banks when the evaluator is in the receptor.

19. A computer as defined in claim 13 wherein said evaluator comprises a portable evaluator having a pair of separately movable parts each having its own gray scale consisting of a plurality of gray scale steps and
  adjustment and detent means for each of said parts whereby an intelligence corresponding to the highlight and shadow densities of copy material may be converted and stored in said evaluator by physically prepositioning the two parts in selected positions corresponding to a selectively matched gray scale step.

20. A computer as defined in claim 13 wherein said main control unit comprises a pulse train generator and wherein said evaluator comprises means for varying the base of the pulse train generator as a function of the setting of said movable gray scale means, and
  wherein said main control unit comprises a counter receiving the output of said pulse train generator and producing an output signal when said pulse train equals the setting of said counter.

21. A control system according to claim 20 comprising means for controlling the setting of said counter.

* * * * *